United States Patent [19]
Satake

[11] Patent Number: 5,659,645
[45] Date of Patent: Aug. 19, 1997

[54] COLLIMATOR WITH ADJUSTING MECHANISM FOR IMPROVED ALIGNMENT BETWEEN OPTICAL FIBER AND LENS

[75] Inventor: Takeshi Satake, Hyogo-ken, Japan

[73] Assignee: Mitsubishi Cable Industries, Ltd., Hyogo-ken, Japan

[21] Appl. No.: 435,136

[22] Filed: May 5, 1995

[30] Foreign Application Priority Data

May 13, 1994 [JP] Japan ................................. 6-099533

[51] Int. Cl.⁶ .......................... G02B 6/32; G02B 6/26; G02B 6/36
[52] U.S. Cl. .............................. 385/33; 385/93; 385/52
[58] Field of Search ................................. 385/90, 93, 25, 385/31, 33, 52, 136, 137

[56] References Cited

U.S. PATENT DOCUMENTS

| | | | |
|---|---|---|---|
| 3,954,338 | 5/1976 | Hennel | 356/138 |
| 4,189,233 | 2/1980 | Hurt | 356/5 |
| 4,707,073 | 11/1987 | Kocher | |

FOREIGN PATENT DOCUMENTS 63-39209 3/1988 Japan .

Primary Examiner—Georgia Y. Epps
Assistant Examiner—John P. Cornely
Attorney, Agent, or Firm—Birch, Stewart, Kolasch & Birch, LLP.

[57] ABSTRACT

A receptacle has an end surface supported along a plane extending at right angles to the axis of the receptacle and a contact surface at the other end. The contact surface also extends at right angles to the axis of the receptacle. A receptacle holder has a recess within which the receptacle is received. An adjusting mechanism is devised to adjust radial position of the receptacle. A lens holder is attached to the other end of the receptacle holder. A slide member has a sliding surface in surface contact with the contact surface of the receptacle. The slide plate is urged toward the one end of the receptacle so as to bring the sliding surface into contact with the contact surface of the receptacle. An optical fiber is inserted into the receptacle through a ferrule. If the optical fiber is twisted, the slide plate permits ready rotation of the receptacle in a torsional direction so as to prevent the optical fiber from being subjected to torsional stress. Also, opposite ends of the receptacle are gripped in surface contact and supported in a plane extending at right angles to the axis of the receptacle holder. This arrangement prevents inclination of the receptacle and thus, optical misalignment of the optical fiber and the lens if the weight of the optical fiber is applied.

10 Claims, 3 Drawing Sheets

COLLIMATOR WITH ADJUSTING MECHANISM FOR IMPROVED ALIGNMENT BETWEEN OPTICAL FIBER AND LENS

BACKGROUND OF THE INVENTION

1. Field of the Invention

The present invention relates to a collimator used to focus a parallel beam on an optical fiber and render parallel to light from the optical fiber.

2. Description of Related Art

Generally, when a high power laser such as a yag laser is used to cut, weld or pierce metals, light from the laser is focused on an optical fiber by a lens and then, transmitted to a place where the metals are machined. A collimator is used to transmit a laser beam to the optical fiber through the lens. The construction of a collimator shown in FIGS. 5 and 6 is disclosed in Japanese Utility Application No. U61-132837, filed on Aug. 29, 1986 by the applicant of the present invention.

Referring now to FIGS. 5 and 6, a collimator comprises a cylindrical receptacle 6 into which a ferrule 4 is fit to receive one end of an optical fiber 2, a cylindrical receptacle holder 8 for holding the receptacle 6, and a cylindrical lens holder 12 for holding a lens 10. A rolling bearing 14 is secured around one end of the receptacle 6. The ferrule 4 is fit into the other end of the receptacle 6. A cap nut 16 is used to prevent the escape of the ferrule 4 from the receptacle 6. A screw 18 limits movement of the cap nut 16.

The receptacle holder 8 includes a receptacle support 8a and a lens holder mount 8b. The receptacle support 8a has a recess 8g to receive the rolling bearing 14 and part of the receptacle 6. The lens holder mount 8b has a light passageway 8h. A step 8c extends radially inwardly from the inner wall of the receptacle holder to provide an optical communication between the recess 8g and the light passageway 8h.

An adjusting mechanism 20 is arranged on the peripheral wall of the receptacle support 8a so as to adjust radial position of the receptacle 6 to align the optical axes of the optical fiber 2 and the lens 10. Four threaded bores 8m extend radially through the receptacle support 8a and are arranged in a circumferentially 90° spaced relationship. Each adjusting mechanism 20 includes a screw 24 received in one of the two diametrically opposite threaded bores 8m, a locking nut 28 on the screw 24, and a spring-loaded screw 26 received in the other threaded bore 8m.

Each screw 24 has a grip 24a at its one end, a pin 24b at the other end, and a thread 24c formed between the grip 24a and the pin 24b. The spring-loaded screw 26 has a spring 26a, an externally threaded member 26b connected to one end of the spring 26a, and a pin 26c connected to the other end of the spring 26a.

Within the recess 8g of the receptacle holder 8, the rolling bearing 14 is supported at four points by the screws 24 and the spring-loaded screws 26. The grip 24a is rotated to cause radial reciprocal movement of the screw 24. As, this occurs, the pin 26c of the spring-loaded screw 26, which is located in a diametrically opposite relation to the grip 24a, is radially moved in a reciprocal fashion under the action of the spring 26a. Thus, the rolling bearing 14 and the receptacle 6 are each moved in two cross directions along a plane extending at right angles to the axis of the receptacle.

An annular retaining plate 30 is secured to the receptacle support 8a by screws 32. A washer 34 and a belleville spring 36 are axially disposed between the retaining plate 30 and the rolling bearing 14. The washer 34 is used to prevent rotation of the outer race of the rolling bearing 14.

The lens holder 12 includes a cylindrical body 12a and a flange 12b. The cylindrical body 12a is threaded into the lens holder mount 8b and secured in position by set screws 38. The lens 10 is fit in the flange 12b and secured by a ring 40 which is, in turn, threaded to the cylindrical body 12a. The flange 12b has through holes 12c to receive bolts.

Again, the ferrule 4 is fixed to the receptacle 6 by the cap nut 16 and supports the optical fiber 2. If the optical fiber 2 is twisted, the receptacle 6 tends to be twisted through the ferrule 4. In such a case, the receptacle 6 is rotated within the receptacle holder 8 through the rolling bearing 14 so as to accommodate a twist of the receptacle. Thus, the optical fiber 2 is not subject to torsional stress.

In order to focus light from a laser, not shown, on the optical fiber 2 by the lens 10, the grip 24a of each adjusting mechanism 20 is rotated to radially move the screw 24 in a reciprocal manner. Then, the rolling bearing 14 and the receptacle 6 are each moved in two cross directions along a vertical plane. This results in optical alignment of the axes of the optical fiber 2 and the lens 10. After this alignment, the locking nut 28 is operated to cause the screw 24 to positively fix the receptacle 6.

Then, the receptacle holder 8 is rotated relative to the lens holder 12 so as to bring the end of the optical fiber 2 into coincident with the focal point of the lens 10. Thereafter, the lens holder 12 is positively fixed to the receptacle holder 8 by means of the set screws 38.

However, the rolling bearing 14 as well as the washer 34 and the belleville spring 36 can not readily be mounted to the collimator although the rolling bearing 14 prevents the optical fiber 2 from being subject to torsional stress. The rolling bearing 14 also complicates the overall structure of the collimator.

In addition, the rolling bearing 14 is axially held in position only by the belleville spring 36 when the grip 24a of each adjusting mechanism 20 is rotated to effect optical alignment. If the weight of the optical fiber 2 is applied to the receptacle 6 through the ferrule 4, then the receptacle 6 is inclined together with the rolling bearing 14 to cause misalignment of the lens 10 and the optical fiber 2. As a result, light passing through the lens 10 cannot properly be focused on the optical fiber 2.

SUMMARY OF THE INVENTION

Accordingly, it is an object of the present invention to provide a collimator which enables ready assembly and is simple in structure as a whole without subjecting an optical fiber to torsional stress.

It is another object of the present invention to provide a collimator which positively prevents an optical fiber from being subject to torsional stress if the optical fiber is twisted.

It is still another object of the present invention to provide a collimator which prevents inclination of a receptacle relative to a receptacle holder and insures precision optical alignment of a lens and an optical fiber if the weight of the optical fiber is applied to one end of the receptacle.

Other objects of the invention will become apparent from the description given below, it should be understood that the description and examples given below are intended to illustrate the invention, and not to limit the scope of the invention, since many modifications and variations of the examples disclosed herein are within the scope of the invention.

According to a preferred embodiment of the present invention, there is provided a collimator which achieves the above objects and comprises a receptacle, a receptacle holder, an adjusting mechanism, a lens holder and a slide member. The receptacle is adapted to receive a ferrule within which an optical fiber is held. The receptacle has an end surface supported in a plane extending at right angles to the axis of the receptacle and a contact surface at the other end. The contact surface extends at right angles to the axis. The receptacle holder has an axial recess at its one end and a light passageway at the other end. The axial recess is formed to receive the receptacle and is optically communicated with the light passageway. The adjusting mechanism is devised to adjust radial position of the receptacle within the receptacle holder. The lens holder is mounted to the other end of the receptacle holder and holds a lens. The slide member has a sliding surface in surface contact with the contact surface of the receptacle. The slide member is urged toward one end of the receptacle to bring the sliding surface into contact with the contact surface of the receptacle.

According to a preferred embodiment of the present invention, the slide member may be urged toward the one end of the receptacle by press members. The press members may apply an adjustable force to the slide member. A retaining member may be used to support the end surface of the receptacle along a plane extending at right angles to the axis of the receptacle. The receptacle includes a pair of axially opposite flanges. One of the flanges includes the end surface of the receptacle, and the other flange includes the contact surface of the receptacle. The receptacle also has a cylindrical portion between the opposite flanges. The outer periphery of the cylindrical portion may be pressed by the adjusting mechanism.

With this arrangement, the receptacle is contacted with the receptacle holder through the slide member. The mating surfaces of these members lie in a plane extending at right angles to the axial direction. If the weight of the optical fiber is applied to the one end of the receptacle, the receptacle may be moved along this plane, but will not be inclined relative to the receptacle holder. Thus, the lens within the lens holder and the ferrule within the receptacle can be axially aligned to prevent optical misalignment of the ferrule and the optical fiber if the weight of the optical fiber is applied.

Also, the slide member is disposed between the receptacle holder and the receptacle. The receptacle is rotated to completely or substantially prevent the optical fiber from being subject to torsional stress when the optical fiber is twisted.

BRIEF DESCRIPTION OF THE DRAWINGS

The accompanying drawings, which are incorporated in and form a part of this specification, illustrate embodiments of the invention and, together with the description serve to explain the principles of the invention. In the drawings.

In all these figures, like components are indicated by the same numerals.

DETAILED DESCRIPTION OF THE PREFERRED EMBODIMENT

Figure 1:
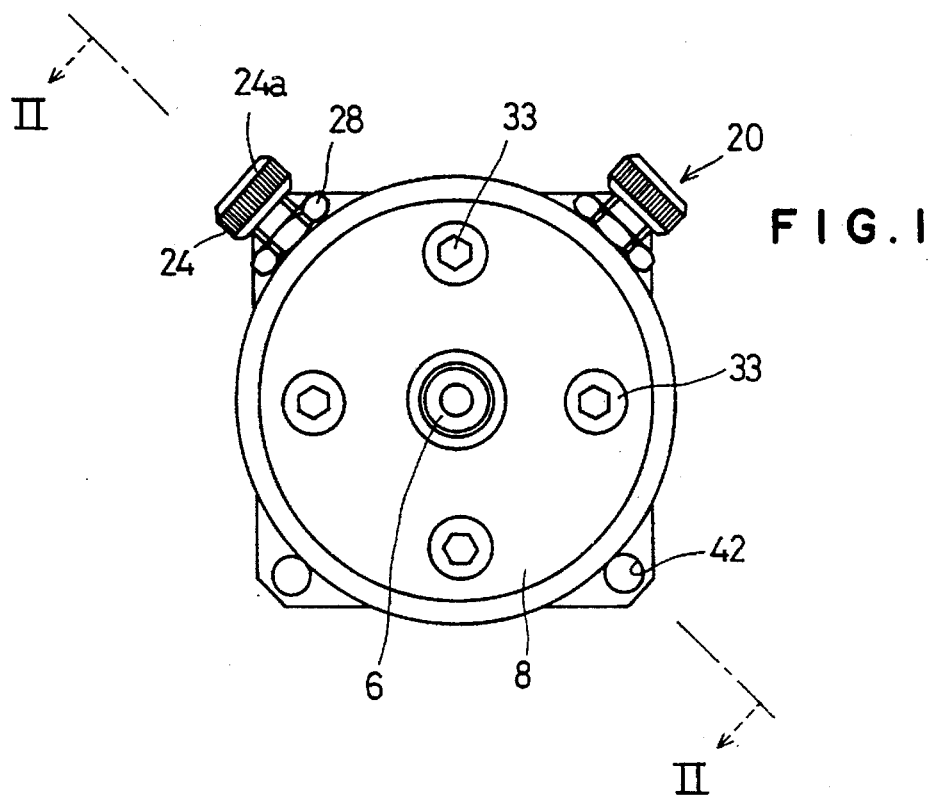
FIG. 1 is a front view of a collimator according to a preferred embodiment of the present invention.

Referring to FIGS. 1 to 4, a collimator according to a preferred embodiment of the present invention comprises a receptacle 6 within which a ferrule 4 is mounted to receive one end of an optical fiber 2, a receptacle holder 8 for holding the receptacle 6, and a lens holder 12 for holding a lens 10.

The receptacle 6 includes a large diameter cylindrical portion 6a and a small diameter cylindrical portion 6a' located axially forwardly of the large diameter cylindrical portion 6a. A pair of flanges 6b and 6b' extend outwardly from opposite ends of the large diameter cylindrical portion 6a. The ferrule 4 is received within the small diameter cylindrical portion 6a' of the receptacle 6. A cap nut 16 is fit over the receptacle 6 to prevent escape of the ferrule 4 from the cylindrical portion 6a'.

The receptacle holder 8 includes a cylindrical receptacle support 8a and a cylindrical lens holder mount 8b axially connected in a unitary fashion to the receptacle support 8a and having a diameter smaller than that of the receptacle support 8a. The receptacle support 8a has an axial recess 8g to receive the receptacle 6. The lens holder mount 8b includes an axial hole 8p having a diameter smaller than that of the recess 8g, and a light passageway 8h optically communicated with the recess 8g through the hole 8p and having a diameter larger than that of the recess 8g. A step 8b is formed between the recess 8g and the light passageway 8h and has a small diameter.

In order to adjust the optical axis of the optical fiber 2, an adjusting mechanism 20 is mounted to the periphery of the receptacle support 8a to adjust radial position of the receptacle 6. Four threaded bores 8m extend radially through the receptacle support 8a and are arranged in a circumferentially 90° spaced relationship. Each adjusting mechanism 20 includes a screw 24 received in one of the two diametrically opposite threaded bores 8m, a spring-loaded screw 26 received in the other threaded bore 8m, and a locking nut 28 adapted to fix the screw 24 in position.

The screw 24 includes a grip 24a at its one end, a pin 24b at its other end, and a groove or thread 24c extending between the grip 24a and the pin 24b. The pin 24b has a semispherical end in contact with the large diameter cylindrical portion 6a.

The spring-loaded screw 26 includes an externally threaded member 26a, a spring 26b and a pin 26c. A groove is formed in the outer periphery of the externally threaded member 26a. The externally threaded member 26a is cylindrical and has a closed bottom. The spring 26b and the pin 26c are received within the externally threaded member 26a. The pin 26c has a semispherical end which slightly extends out of the externally threaded member 26a and is in contact with the cylindrical portion 6a of the receptacle 6.

Within the recess 8g of the receptacle holder 8, the receptacle 6 is supported at four points by the screws 24 and the spring-loaded screws 26. As the grip 24a is rotated to radially move the screw 24 toward and away from the receptacle 6, the pin 26c of the spring-loaded screw 26 located in a diametrically opposite relation to the screw 24 is moved in a reciprocal fashion under the action of the spring 26b. As a result, the receptacle 6 is moved in the cross directions along a plane extending at right angles to the axis of the receptacle.

Figure 4:
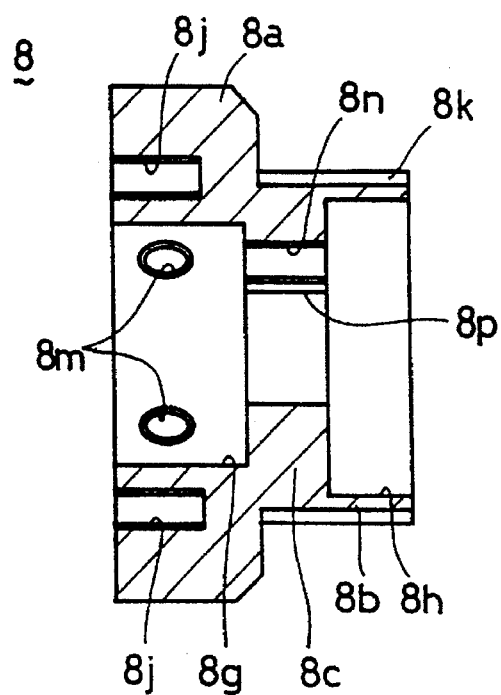
FIG. 4 is a sectional view of a receptacle holder of the collimator shown in FIG. 1 as seen in a direction different from that of FIG. 2.
Figure 5:
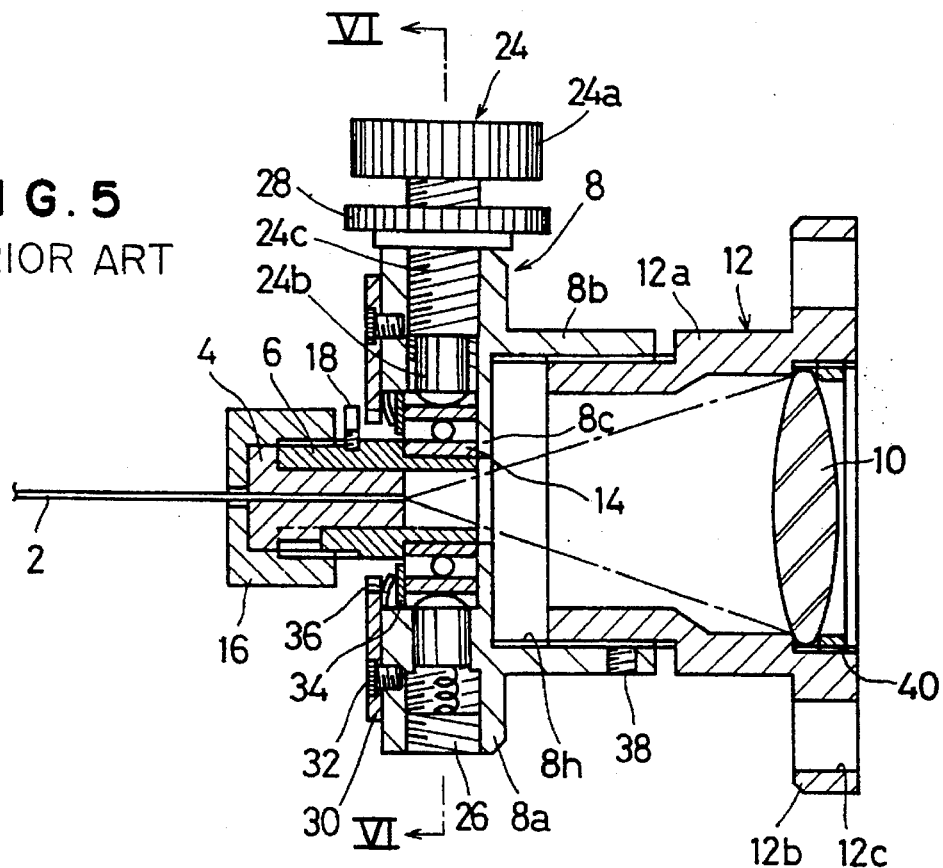
FIG. 5 is a sectional view of a conventional collimator.
Figure 6:
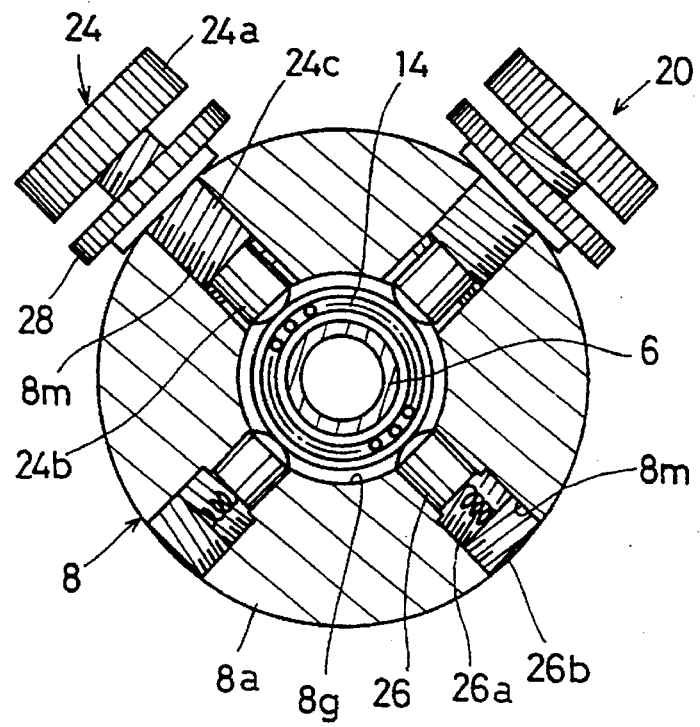
FIG. 6 is a sectional view taken on the line VI—VI in FIG. 5.

As shown in FIG. 4, a plurality of internally threaded portions 8j are formed in the receptacle support 8a of the receptacle holder 8 to receive a plurality of corresponding bolts 33 so as to secure an annular retaining plate 30 to one side of the receptacle support 8a. The retaining plate 30 thus secured to the end surface of the receptacle support 8a is in surface contact with the flange 6b. Key grooves 8k are formed in the outer periphery of the lens holder mount 8b.

Figure 2:
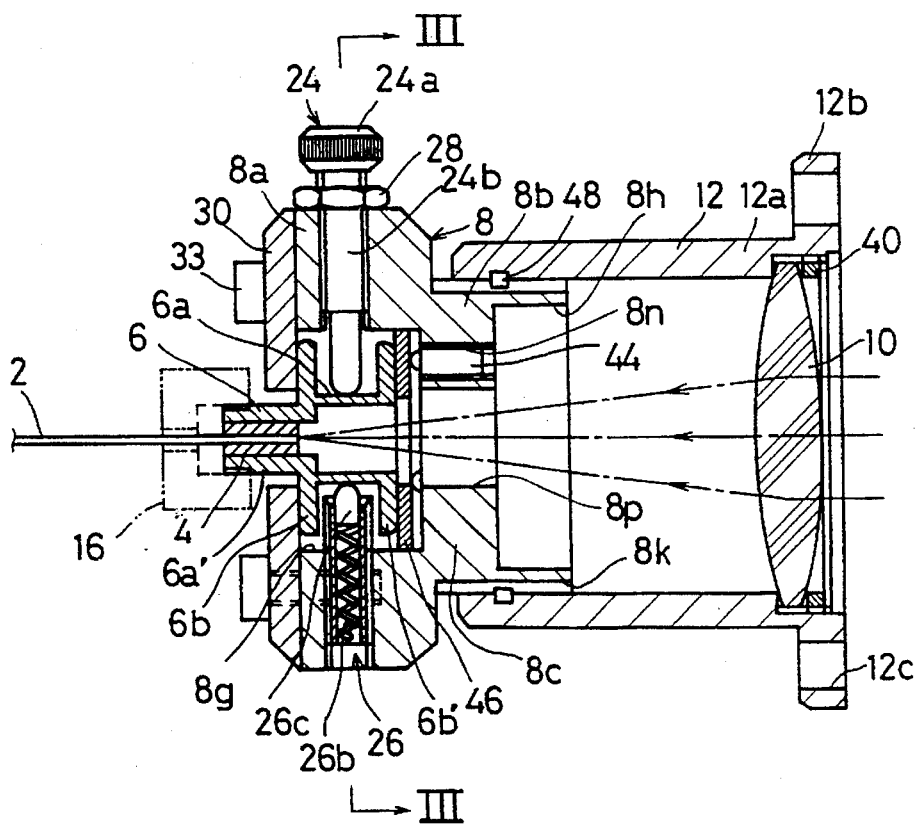
FIG. 2 is a sectional view of the collimator taken on the line II—II in FIG. 1.
Figure 3:
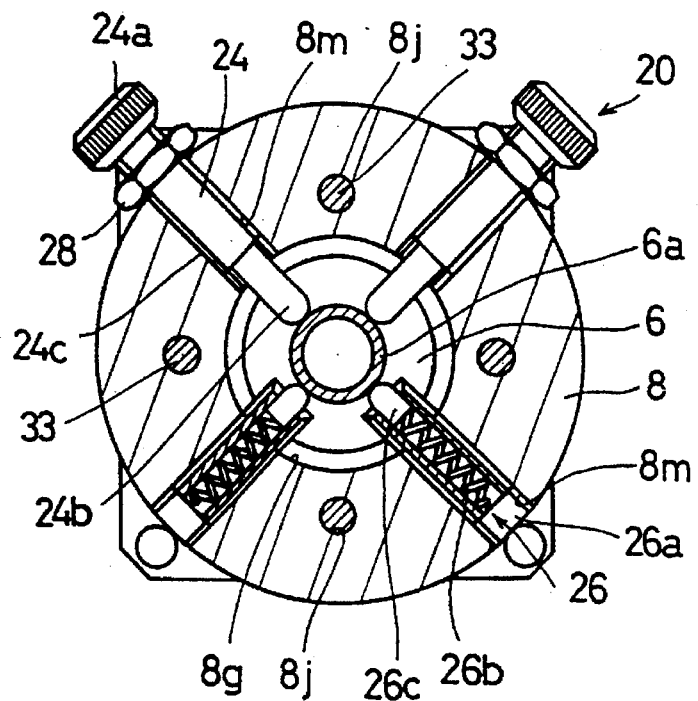
FIG. 3 is a sectional view of the collimator taken on the line III—III in FIG. 2.

A plurality of threaded bores 8n are formed in the step 8c of the receptacle holder 8 in a circumferentially 120° spaced relationship and extend between the recess 8g and the light passageway 8h. Only one of the three threaded bores 8n is shown in FIGS. 2 and 4. Three press screws 44 are threaded into the corresponding threaded bores 8n. A slide plate 46 is disposed in an axial space between the flange 6b' of the receptacle 6 and the step 8c and is axially movable by the press screws 44. The slide plate 46 has a sliding surface in surface contact with the surface of the flange 6b' of the receptacle 6.

Again, the slide plate 46 is disposed between the flange 6b' of the receptacle 6 and the press screws 44 and is in surface contact with the flange 6b'. This arrangement prevents the flange 6b' from being subject to damage which may otherwise occur when the flange 6b' is pressed directly by the press screws 44.

The lens holder 12 includes a cylindrical body 12a and a flange 12b formed at one end of the cylindrical body 12a. The lens 10 is fit within the cylindrical body 12a. A ring 40 is threaded into the cylindrical body 12a to fix the lens 10 in position. A pair of diametrically opposite pins 48 extend radially inwardly from the other end of the cylindrical body 12a and are fit in the key grooves 8k on the receptacle holder 8. Thus, the lens holder 12 can be axially slidable on the receptacle holder. A plurality of threaded bores (not shown) extend radially through the peripheral wall of the cylindrical body 12a. A plurality of corresponding set screws (not shown) extend through the threaded bores so as to fix the lens holder 12 to the receptacle holder 8. A plurality of through holes 12c are formed in the flange 12b of the lens holder 12 to receive a plurality of corresponding bolts.

As states earlier, the receptacle 6 is received within the recess 8g of the receptacle holder 8 with the pair of flanges 6b and 6b' being in surface contact or sandwiched between the retaining plate 30 and the slide plate 46. The retaining plate 30 and the slide plate 46 are operatively associated with each other to apply a force to grip the flanges 6b and 6b'. The amount of this force varies depending on the axial position of the press screws 44 which are threaded into the step 8c of the receptacle holder 8. The receptacle 6 is slidable in a direction at right angles to the axis of the receptacle and rotatable about its own axis while an appropriate amount of force is applied from the press screws 44 to the slide plate 46.

When the ferrule 4 is inserted into the receptacle 6 and then, fixed in position by the cap nut 16, the receptacle 6 is rotated about its own axis in order to substantially reduce torsional stress applied to the optical fiber 2, one end of which is fixed within the ferrule 4.

After the ferrule 4 has been inserted into the receptacle 6, the grip 24a of each of the screws 24 in the adjusting mechanism 20 is operated to move the receptacle 6 in the cross directions along a vertical plane so as to optically align the optical fiber 2 and the lens 10. After this optical alignment, the locking nut 28 is rotated to cause the screw 24 to fixedly secure the receptacle 6. As stated earlier, the flanges 6b and 6b' of the receptacle 6 are sandwiched between the retaining plate 30 and the slide plate 46 along a plane extending at right angles to the axis of the receptacle. Thus, if the weight of the optical fiber 2 is applied to the receptacle 6 through the ferrule 4, the receptacle 6 will in now way be inclined in directions other than its radial direction. In other words, the optical fiber 2 and the lens 10 will not be optically misaligned once they are aligned.

In order to bring the end of the optical fiber into alignment with the focal point of the lens 10, the receptacle holder 8 is axially moved relative to the lens holder 12. After this alignment, the lens holder 12 is fixed to the receptacle holder 8 by set screws (not shown).

In the illustrated embodiment, a parallel beam is focused on the optical fiber 2 by means of the lens 10. Alternatively, the invention may be applied to the case wherein light from the optical fiber 2 is rendered parallel by the lens 10.

In summary, all such modifications and variations that may be apparent to a person skilled in the art are intended to be within the scope of this invention.

What is claimed is:

1. A collimator comprising a receptacle, a receptacle holder, an adjusting mechanism, a lens holder and a slide plate, said receptacle having one end and the other end, said receptacle being adapted to receive a ferrule within which an optical fiber is held, said receptacle having at the other end a contact surface extending at right angles to the axial direction, said receptacle holder having one end and the other end, said receptacle holder having an axial recess at said one end to receive said receptacle, said receptacle holder having at the other end a light passageway optically communicated with said axial recess, said adjusting mechanism devised to adjust radial position of said receptacle within said axial recess of said receptacle holder, said lens holder mounted to the other end of said receptacle holder and adapted to hold a lens, and said slide plate having a sliding surface in surface contact with said contact surface of said receptacle, said sliding surface being urged toward said contact surface of said receptacle.

2. The collimator according to claim 1, further including press members adapted to urge said slide plate toward said one end of said receptacle.

3. The collimator according to claim 2, wherein said press members include press screws threaded into threaded bores of said receptacle holder, said press screws being moved within said threaded bores so as to adjustably apply a bias force to said slide plate.

4. The collimator according to claim 1, further including a retaining member secured to said one end of said receptacle holder so as to support said end surface of said receptacle, said retaining member having a contact surface in surface contact with said end surface of said receptacle in a plane extending at right angles to the axial direction.

5. The collimator according to claim 1, wherein said receptacle includes a pair of opposite flanges axially spaced a predetermined distance away from each other, one of said flanges including said end surface of said receptacle, and the other flange including said contact surface of said receptacle.

6. The collimator according to claim 5, wherein said receptacle includes a cylindrical portion between said pair of flanges, said cylindrical portion having an outer periphery pressed by said adjusting mechanism.

7. The collimator according to claim 5, wherein said receptacle includes a first cylindrical portion at said one end and a second cylindrical portion at said other end, said first cylindrical portion having a predetermined diameter, and wherein said ferrule is received within said first cylindrical portion, and said pair of flanges extend from the outer periphery of said second cylindrical portion, said adjusting mechanism having one end adapted to press the outer periphery of said second cylindrical portion.

8. The collimator according to claim 2, wherein said receptacle holder includes a step between said recess and said light passageway, said step including axial through bores to receive said press members, said press members being adapted to axially urge said slide plate so as to adjust axial position of said slide plate.

9. The collimator according to claim 1, further including a plurality of through bores formed in said one end of said receptacle holder in a circumferentially equally spaced relationship, said adjusting mechanism comprising a first adjusting mechanism inserted into one of a pair of diametrically opposite through bores and a second adjusting mechanism inserted into the other through bore, said first and second adjusting mechanism being operable to press the outer periphery of said receptacle.

10. The collimator according to claim 9, wherein said pair of through bores includes threaded bores, said first adjusting mechanism including a screw threaded into one of said through bores, and said second adjusting mechanism including a spring-loaded screw threaded into the other through bore.

* * * * *